N. D. FORBES.
FLASH LIGHT BATTERY.
APPLICATION FILED APR. 13, 1920.
1,358,717.
Patented Nov. 16, 1920.
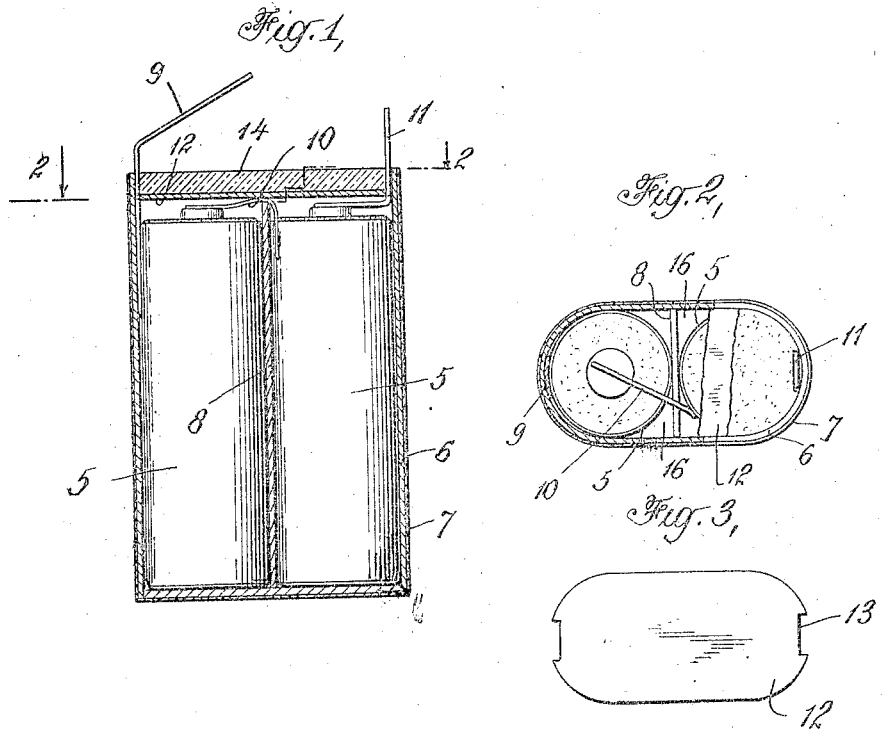
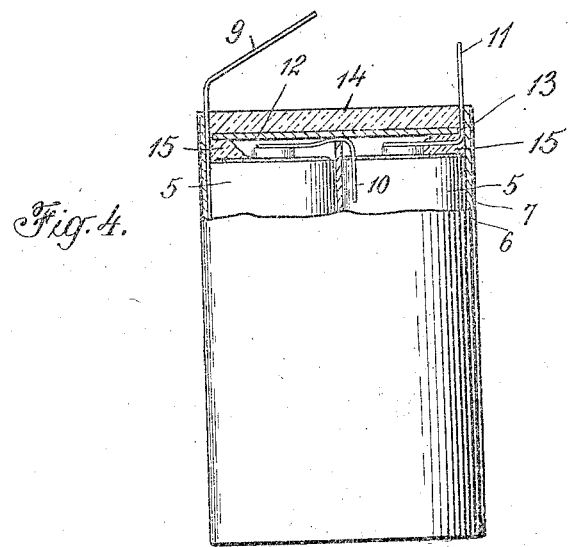
Inventor
Nathaniel D. Forbes
By his Attorneys

UNITED STATES PATENT OFFICE.

NATHANIEL D. FORBES, OF WEST HAVEN, CONNECTICUT, ASSIGNOR TO WINCHESTER REPEATING ARMS COMPANY, OF NEW HAVEN, CONNECTICUT, A CORPORATION OF CONNECTICUT.

FLASH-LIGHT BATTERY.

1,358,717.

Specification of Letters Patent.   Patented Nov. 16, 1920.

Application filed April 13, 1920. Serial No. 373,462.

*To all whom it may concern:*

Be it known that I, NATHANIEL D. FORBES, a citizen of the United States, residing at West Haven, in the county of New Haven, State of Connecticut, have invented certain new and useful Improvements in Flash-Light Batteries; and I do hereby declare the following to be a full, clear, and exact description of the invention, such as will enable others skilled in the art to which it appertains to make and use the same.

This invention relates to flashlight batteries of the type in which a number of cells are placed side by side within a casing or carton and connected to each other in series. Batteries of this character are particularly adapted for use in flashlights of the so called vest pocket and cigarette case types. The cells composing the batteries consist of zinc cups filled with active material and containing carbon electrodes which project through plugs or covers of wax, or other suitable material which seal the tops of the cells. The exposed ends of the carbon electrodes are covered by caps of metal to which are attached the conductors which connect the cells to each other. One of the end cells of the battery has attached to its zinc cup a metallic member which projects beyond the end of the battery in position to engage a terminal of the incandescent lamp of the flashlight, and the carbon electrode of the other end cell is provided with a projecting contact member adapted to be engaged by a switch device mounted on the casing of the flashlight for controlling the circuit of the incandescent lamp.

In manufacturing batteries of this type, after the desired number of cells have been assembled in a casing or carton, melted wax or other suitable sealing material is poured over the tops of the cells to conceal the exposed terminals and connections, and also to hold the cells in place in the carton. The upper edge of the carton projects a short distance beyond the tops of the cells to provide a wall for confining the wax and to which it adheres to hold the cells in place, and the terminals of the battery project beyond the top of this wax plug or cover.

In manufacturing batteries of this type difficulty is encountered when pouring the wax over the tops of the cells, due to the fact that the sides of the cartons are tangential to the cells, thus leaving triangular spaces into which the wax may run. Not only is wax wasted in filling spaces which do not require to be filled, but the hot wax causes expansion of the air within these spaces, thus producing bubbles within the wax which lessen its insulating and sealing effects and mar the appearance of its outer face when it has solidified. Even if the wax is poured to the level of the top of the carton the leakage or dripping into the triangular spaces while the wax is in molten condition may result in a change of level of the wax while cooling, with inconvenience to the workman and impairment of the product.

It is an object of this invention to avoid the difficulty mentioned above, by providing a member adapted to be fitted within the carton above the cells and serving as a bottom for the space that is to be filled with sealing material to confine the material and prevent it from running into the vacant spaces between the cells and their surrounding carton. While the member is of substantially the same shape as the transverse section of the carton and fits closely within the latter, some of the sealing material may run beneath the member and tend to fill up the vacant space between the member and the tops of the cells. These portions of the material will then act as lugs to hold the mass of material more securely in place, but the member will prevent the material from running into the large spaces between the cells and the sides of the carton, and thus will effect a saving in the material that need be used, as well as prevent imperfections due to bubbles in the material and changes in level of the material during cooling.

The particular nature of the invention, as well as other objects and advantages thereof, will appear more clearly from a description of certain preferred embodiments as shown in the accompanying drawings in which—

Figure 1 shows in longitudinal cross-section a battery in which all of the sealing material is disposed above the top of the member forming the bottom of the cavity within which the material is contained;

Fig. 2 is a transverse sectional view along the line 2—2 of Fig. 1;

Fig 3. is a plan view of the member which prevents the sealing material from running into the battery; and Fig. 4 is a view similar to Fig. 1, but representing a battery in which some of the sealing material has run beneath the transverse member.

The battery shown in the drawings consists of a number of dry cells 5 of any suitable type. As shown herein the battery is made up of a pair of cells, but it will be understood that any desired number may be used. The cells are placed within a carton or casing 6 formed of suitable non-conducting material such as paper and surrounded by the usual wrapper 7 which is in the nature of a label. The cells are separated from each other by a partition 8 of insulating material, such as waxed paper. A metallic member 9 is soldered or otherwise attached to the zinc cup of one of the cells and projects beyond the end of the battery where it is suitably bent to be brought into engagement with a lamp terminal when the battery is placed within the casing of a flashlight. The carbon electrode of the same cell is connected by means of a wire 10 to the zinc electrode of the other cell, and the carbon terminal of the latter cell carries a conducting member 11 which projects beyond the top of the battery in position to be engaged by a switch device associated with the casing of the flashlight.

In accordance with the present invention there is provided a member 12 formed of insulating material such as cardboard or the like. This member conforms in size and shape to the interior of the carton and may be provided at its ends with notches 13 through which the terminals 9 and 11 extend. The member is placed within the top of the carton and rests upon the upper edge of the partition 8 in case the latter extends above the carbon terminals of the cells but it will be understood that the partition may not extend as far as shown in the drawings, in which case the member 12 may rest upon the tops of the carbon terminals. After the member has been placed within the top of the carton, suitable sealing material 14, such as the usual red sealing wax, is poured into the shallow space thus provided, to a level flush with the edge of the carton.

The member 12 may fit so closely within the carton that none of the sealing material will run below the member, in which case the resulting article will appear as in Fig. 1, or in case the member 12 does not fit as closely within the top of the carton, some of the sealing material may run below the latter to partially fill the space between the member and the tops of the cells as shown in Fig. 4. In this case the portions of the material which lie below the member 12 form lugs as at 15 which tend to hold the mass of material and the member 12 more securely in place within the end of the carton. In any event, however, the member 12 should fit so closely within the carton that none, or substantially none, of the sealing material runs over the edges of the member and into the triangular spaces 16 which are bounded by the flat sides of the carton, the partition 8 and the cups of the cells.

The invention thus provides an arrangement for preventing any sealing material from flowing into the triangular spaces within the battery, thereby conserving the amount of material which it is necessary to use in sealing the cells in place as well as preventing the formation of bubbles in the material, due to the expansion of the air within the triangular spaces into which the hot sealing material ordinarily runs. The member will also prevent changes in level of the sealing material due to leakage down the sides of the zinc cups while the material is solidifying. The members 12 may be formed of any suitable inexpensive material and may be cheaply produced in large quantities by dies of suitable shape. As the members require no fastening devices they may be quickly inserted and thus do not add materially to the cost of assembling the parts of the batteries.

I claim:

1. In a dry battery consisting of a number of cylindrical dry-cells arranged side by side within an oval paper carton and adapted to be held therein by sealing material at the top of the carton, the combination of means for preventing the hot sealing material from running into the free triangular spaces between the cells and the carton, when it is poured into the carton.

2. In a dry battery consisting of a number of cells arranged side by side within a carton and adapted to be held therein by sealing material at the top of the carton, the combination of a transverse member fitted within the end of the carton above the tops of the cells for preventing the material from running into the free spaces between the cells and the carton, when it is poured into the carton.

3. In a dry battery consisting of a number of cells arranged side by side within a carton and adapted to be held therein by sealing material at the top of the carton, the combination of a transverse member fitted within the carton and spaced from the tops of the cells for holding the sealing material and preventing any substantial accumulation thereof beneath the member.

4. In a dry battery consisting of a number of cells arranged side by side within a carton and adapted to be held therein by sealing material at the top of the carton, the combination of a transverse member within the carton and spaced from the tops of the cells, said member fitting the inside of the carton tightly enough to prevent the material from running into the free spaces between the cells and carton, when it is poured into the top of the carton, but permitting some of the material to flow into the space between the member and the tops of the cells to aid in holding the material in place when it has solidified.

5. In a dry battery consisting of a number of cylindrical dry-cells disposed side by side within an oval paper carton which extends above the tops of the cells, the combination of an oval paper member fitted within the top of the carton adjacent to but spaced from the ends of the cells and sealing material filling the space above the member and having its top substantially flush with the top of the carton.

6. In a dry battery consisting of a number of cells disposed side by side within a carton which extends above the tops of the cells, and terminals for the cells consisting of flat members projecting beyond the top of the carton, the combination of a member fitted within the top of the carton and provided at its ends with notches through which the terminals pass, and sealing material filling the space above the member and around the terminals.

7. In a dry battery consisting of a carton containing a number of cylindrical dry-cells placed side by side and separated from each other by an insulating partition, the combination of a member fitted within the top of the carton and seated on said partition and spaced from the tops of the cells and sealing material overlying the member and adhering to the inner face of the carton to seal the cells therein.

8. In a dry battery consisting of a carton containing a number of cells placed side by side and separated from each other by insulating partitions which extend beyond the tops of the cells, the combination of a member fitted within the top of the carton and resting upon the tops of the partitions, and a layer of sealing material overlying the member and adhering to the inner face of the carton to seal the cells therein.

In testimony whereof I affix my signature.

NATHANIEL D. FORBES.